Patented Sept. 12, 1939

2,173,054

UNITED STATES PATENT OFFICE 2,173,054

MONAZO DYES FOR CELLULOSE ESTERS AND ETHERS

Emmet F. Hitch, Wilmington, Del., assignor to E. I. du Pont de Nemours & Company, Wilmington, Del., a corporation of Delaware No Drawing. Application June 11, 1938, Serial No. 213,211

10 Claims. (Cl. 8—50)

This invention relates to the dyeing of cellulose esters, ethers and similar materials, such as cellulose acetate silk, and especially to monazo dyes having in at least one of their components a secondary or tertiary amino group having a polyhydroxyalkyl radical in which alkyl has four to six carbon atoms and one less hydroxy than carbon atoms.

Heretofore benzene-azo-bis-dihydroxyethyl-aniline in which benzene is substituted by nitro or amino and benzene-azo-bis-dihydroxypropyl-aniline were known as soluble dyes for acetate silk but when the hydroxy alkyl radicals of these compounds contained four hydroxy groups the affinity of the compounds for cellulose acetate was found to be unsatisfactory. Other dyes heretofore used for dyeing acetate silk were insoluble or so nearly insoluble in water that it was necessary to pre-treat them to obtain a finely subdivided state of the dye and good dispersion thereof in the dye bath so that uneven dyeings could be avoided. In printing and often with dyeings made with such insoluble dyes, the printing and dyeings were speckled. Neither the soluble nor the insoluble dyes used heretofore had as satisfactory discharge properties as were desired; and many of the soluble dyes have not given dyeings on cellulose acetate which had satisfactory fastness to light and washing. It was therefore desirable to provide new water soluble dyes for cellulose esters and ethers which have good exhaust, discharge and fastness properties and will give level dyeings and printings.

It has now been discovered that monazo dyes in which at least one of the aryl components is substituted by certain N-polyhydroxyalkyl radicals, give water solutions which dye cellulose esters and ethers from baths and printing compositions in level dyeings and that the dyes have good fastness and discharge properties. Satisfactory heavy dyeings can be made from solutions and the heaviest dyeings can be made from dispersions of the dyes in such solutions. The dyes are easily dispersed in their solutions and the dispersions give even dyeings.

It is among the objects of the present invention to provide for dyeing cellulose esters and ethers with dyes having solubility in water that will give even dyeings and printings. Another object of the invention is to provide dyes which can be easily dispersed when an excess over that which is soluble is present and desirable. Another object of the invention is to provide dyes for cellulose esters and ethers having satisfactory solubility, substantivity, discharge properties and fastness to light and washing. Another object of the invention is to provide dyes for cellulose esters and ethers which have good exhaust properties from solutions and dispersions. Other objects of the invention will be apparent from the following description.

The objects of the invention are attained in general by providing monazo dyes in which the diazo component, coupling component or both the diazo and coupling components of the dye have aryl radicals substituted by a secondary or tertiary polyhydroxyalkyl amino group. Such components are represented generally by the formula

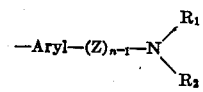

in which Aryl is a radical of the benzene or naphthalene series, Z is a group such as

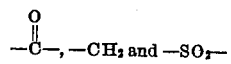

$n$ is 1 or 2, $R_1$ is a polyhydroxyalkyl radical having four to six carbons and one less hydroxy group than carbons and $R_2$ is one of the group consisting of hydrogen, alkyl or substituted alkyl radicals.

The invention will be more fully set forth in the following more detailed description which includes examples that are given as illustrative embodiments of the invention and not as limitations thereof.

EXAMPLE I

*N-(para-amino benzoyl)-N-methyl glucamine→ beta-naphthol*

314 parts of N-(para-amino benzoyl)-N-methyl glucamine were dissolved in 1000 parts of water and 290 parts of 31.5% hydrochloric acid. The solution was cooled to 0° C. by the addition of ice. 69 parts of sodium nitrite dissolved in 300 parts of water were gradually added during three to four minutes. A clear diazo solution was obtained. 144 parts of beta-naphthol were dissolved in 40 parts of sodium hydroxide and 1000 parts of water. The beta naphthol solution was cooled to 0° C. by the addition of ice and 106 parts of sodium carbonate dissolved in 700 parts of water were added. The diazo solution was gradually run into the beta naphthol solution with stirring and when coupling was complete the dye separated from the coupling mixture. It was then isolated by filtration and dried. The compound is represented by the following formula

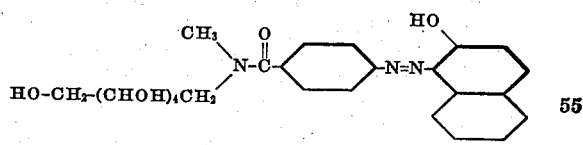

The following illustrates a convenient manner of utilizing the dyes of the invention. One part of the dry dye represented in the foregoing formula was added to 2000 parts of water and heated to 85° C., giving a solution. Fifty parts of a cellulose acetate fabric were entered and dyed in the usual manner by maintaining the dye bath at a temperature between 85° C. and 90° C. for forty-five minutes to one hour. The dyed cellulose acetate was withdrawn from the dye bath, washed well with cold water and dried. In this manner an attractive orange shade was obtained, which had good fastness properties. Dyeing temperatures between 70° C. and 95° C. give satisfactory results.

When it is desirable to have present in the dye bath a larger proportion of dye than was soluble, a dispersion of the dye in the solution was made conveniently by adding a dispersion agent, such as soap. Such a dye bath was used to dye cellulose acetate in the same manner as the solutions were used.

EXAMPLE II

*N-(para-amino benzyl), N-methyl glucamine→ 2,4-dihydroxy quinoline*

By using an equivalent amount of N-(para-amino benzyl), N-methyl glucamine as the amino base instead of N-(para-amino benzoyl), N-methyl glucamine, and 2,4-dihydroxy quinoline as the coupling component instead of beta naphthol as in Example I a dye giving greenish yellow dyeings on acetate silk was made. The dye had satisfactory solubility and good fastness properties and is represented by the formula

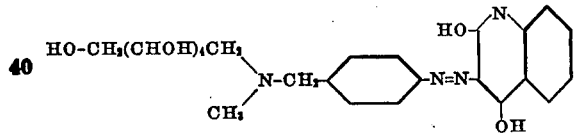

In like manner a greenish yellow dye of similar shade, solubility and fastness properties was made by coupling diazotized N-(para-amino benzoyl) glucamine with 2,4-dihydroxy quinoline. The formula of the compound is represented as follows:

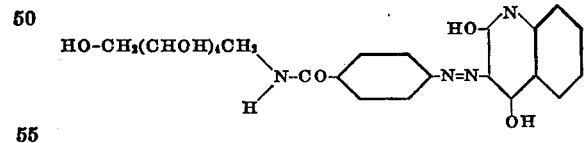

EXAMPLE III

*N-(para-amino benzoyl) glucamine→N-methyl, N-sorbityl aniline*

Three hundred parts of N-(para-amino benzoyl) glucamine were diazotized as in Example I. 271 parts of N-methyl, N-sorbityl aniline were dissolved in 100 parts of water and 116 parts of 31.5% hydrochloric acid. The temperature of this solution was lowered to 0° C. by the addition of ice and 205 parts of sodium acetate were gradually added. The diazo solution was then gradually run into the solution of the tertiary amine with stirring. When coupling was complete the dye was isolated by adding sufficient 30% sodium hydroxide solution so that the coupling mixture was slightly alkaline to Brilliant Yellow paper and by filtering. The compound was then dried. A water solution of the compound dyed cellulose acetate silk a reddish yellow shade when used in the ratio of 1 part of dye to 50 parts of cellulose acetate and 2000 parts of water and a dyeing temperature between 75° C. and 90° C. The compound is represented by the following formula

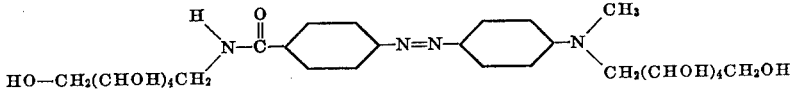

EXAMPLE IV

*Para-nitro aniline→ N-sorbityl aniline*

138 parts of parts of para-nitro aniline were suspended in 1000 parts of water and 290 parts of 31.5% hydrochloric acid. The mixture was cooled to 0–5° C. by adding ice and diazotized by adding 69 parts of sodium nitrite dissolved in 300 parts of water. 257 parts of N-sorbityl aniline were dissolved in 1500 parts of water and 116 parts of 31.5% hydrochloric acid. The mixture was cooled to 5° C. by the addition of ice and the filtered diazo solution was added thereto. To complete the coupling the mineral acidity was destroyed by the addition of 350 parts of sodium acetate trihydrate dissolved in 500 parts of water. The reaction mixture was rendered neutral by the addition of sodium hydroxide solution and the dye was isolated by filtration. The product was soluble in hot water giving an orange colored solution. The solution dyed cellulose acetate silk a heavy orange shade of good fastness to light and washing. The dyeing discharged to a clear white. The dye can be used for the printing of cellulose acetate silk to give non-specky prints. The dye is represented by the formula

EXAMPLE V

*Ortho-chlor-p-nitro aniline→ N-sorbityl 1,5-amino naphthol*

173 parts of ortho-chlor-p-nitro aniline were diazotized in the usual manner as in Example I, and added slowly to an ice cold, dilute acid solution of 333 parts N-sorbityl, 1,5-amino naphthol. The N-sorbityl, 1,5-amino naphthol was prepared by condensing 1,5-amino naphthol with glucose and catalytically reducing. Coupling occurred rapidly in strong acid solution. Sufficient sodium hydroxide solution was added to make the solution neutral and the dye was filtered off and washed. The blue dye was readily dispersed by known methods and dyed cellulose acetate a bright blue shade which was readily dischargeable. The dye is represented by the formula

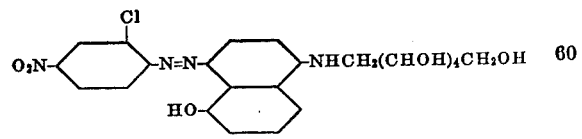

EXAMPLE VI

*5-nitro-2-amino-anisole→N-mannityl 1,5-amino naphthol*

168 parts of 5-nitro-2-amino anisole were diazotized as described in Example I. 333 parts of N-mannityl 1,5-amino naphthol (prepared by treating 1,5-amino naphthol with mannitol chlorhydrin) were dissolved in 2000 parts of water and 116 parts of 31.5% hydrochloric acid and cooled with ice to 5° C. The filtered diazo solution was added to the latter mixture. After stirring for some time to complete the coupling sufficient dilute sodium hydroxide solution was slowly added to make the reaction mixture neutral. The blue dye was isolated by filtration and dried. The product dyed cellulose acetate a heavy blue shade. The dye is represented by the formula

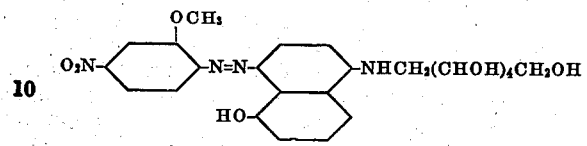

Example VII 172.5 parts of ortho chloro para nitro aniline were diazotized in the usual manner as indicated in the preceding examples and filtered. 285 parts of N-methyl, N-sorbityl meta toluidine were dissolved in 2000 parts of water and 116 parts of 31.5% hydrochloric acid. The mixture was cooled to 5° C. by the adding of ice and the diazo solution was added slowly to the mixture. Coupling proceeded rapidly. The mixture was made slightly alkaline to Brilliant Yellow by the slow addition of dilute caustic, and the precipitate of dye was separated by filtration. A solution of the dye in water heated to 85° C. is bluish red in color and dyes cellulose acetate a heavy bright rubine shade of excellent fastness to light. The compound is represented by the formula

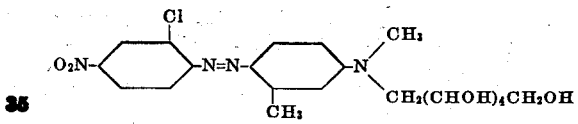

Example VIII 69 parts of dry sodium nitrite were added during 30 minutes to 1450 parts of 100% sulfuric acid whilst keeping the temperature of the mixture below 25° C. by external cooling. The mixture was then stirred thirty minutes. 183 parts of 2.4-dinitro aniline were added to the mixture during 45 minutes. The latter mixture was stirred for one hour and a half, during which time the temperature was allowed to rise to 30° C. The clear solution of diazo salt was poured onto 3000 parts of ice and 500 parts of water and then filtered. 315 parts of N-methyl, N-sorbityl cresidine were dissolved in 2000 parts of water and 116 parts of 31.5% hydrochloric acid, and cooled to 0-5° C. by adding ice. The diazo solution was run slowly into the latter solution and then 1200 parts of sodium hydroxide dissolved in 2500 parts of water were added whilst the temperature was maintained below 10° C. by the addition of ice. The mixture was then made slightly alkaline to Brilliant Yellow paper by the addition of a little dilute sodium hydroxide solution and was filtered. The dye was washed with a little water and dried at 45° C. A solution of the dye in water warmed to 85° C. was violet in color and dyed cellulose acetate a heavy bluish-violet shade of good fastness to light. The product is represented by the formula

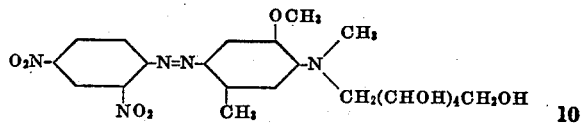

Example IX

An equivalent amount of 6-brom-2,4-dinitro aniline was diazotized in accordance with the procedure of Example VIII instead of the 2,4-dinitro aniline, and coupled with N-methyl, N-sorbityl cresidine. Cellulose acetate silk was dyed a reddish blue from a hot solution of the dye. The product gave a heavy even dyeing which had good light fastness. The product is represented by the formula

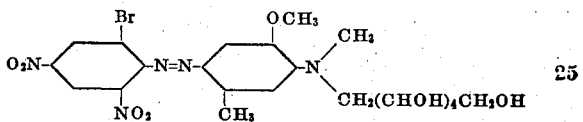

The following monazo compounds were made by processes similar to those described in the foregoing examples. They had the same general properties as the dyes hereinbefore described except where differences are noted. In these examples the arrows point from the compounds which were diazotized toward the compounds which were used as coupling components and the colors noted are those produced by dyeing cellulose acetate silk from solutions of the dyes.

| Example | Amino base | Coupling component | Color |
|---|---|---|---|
| X | N-(para-amino benzyl) N-methyl glucamine⟶ | Para-cresol | Greenish yellow. |
| XI | N-(m-amino benzene sulfonyl) glucamine⟶ | 2,4 dihydroxy quinoline | Do. |
| XII | 2,4-dinitro aniline⟶ | N-sorbityl cresidine | Violet. |
| XIII | 2,6-dichlor-4-nitro-aniline⟶ | Sorbityl cresidine | Reddish brown. |
| XIV | 4-nitro-1-naphthylamine⟶ | ......do...... | Rubine. |
| XV | Para-nitro aniline⟶ | N-sorbityl alpha naphthylamine | Red. |
| XVI | 2,4-dinitro aniline⟶ | N-sorbityl 1, 5-amino naphthol | Greenish blue. |
| XVII | 6, brom-2, 4-dinitro aniline⟶ | ......do...... | Do. |
| XVIII | 4-nitro-1-naphthylamine⟶ | N-sorbityl alpha naphthylamine | Violet. |
| XIX | 2,6-dichlor-4-nitro aniline⟶ | N-methyl, N-sorbityl m-toluidine | Reddish brown. |
| XX | 6, brom-2,4-dinitro aniline⟶ | (N-sorbityl cresidine condensed with three moles of ethylene oxide). | Bluish violet. |

The dyes of the invention are represented generally by the formula Aryl$_1$—N=N—E. When E is the radical of a coupling component which has an aryl nucleus, the aryl nuclei of the diazo and coupling components are like or unlike benzene or naphthalene nuclei. One of the aryl nuclei or both are substituted once by the group —(Z)$_{n-1}$—NR$_1$R$_2$ in which Z is one of a group consisting of

—CH$_2$— and —SO$_2$—, $n$ is an integer 1 or 2, R$_1$ is a polyhydroxyalkyl radical having 4 to 6 carbons and one less hydroxy than carbons and R$_2$ is one of a group consisting of hydrogen, alkyl and substituted alkyl. The aryl nuclei may be unsubstituted by other groups or substituted once or more times by various groups other than the group —(Z)$_{n-1}$—NR$_1$R$_2$. Where a compound of the general formula is made by diazotizing an amino base having as one of or its only substituent a group —(Z)$_{n-1}$—NR$_1$R$_2$ and the nucleus of the coupling component is benzene or naphthalene, these coupling components must have a group present which enables coupling, such as amino, hydroxy or another $$—(Z)_{n-1}—NR_1R_2$$

group. These coupling components can also be substituted by other groups which do not interfere with coupling, except sulfonic acid and carboxy. However, in such cases other azo dye coupling components in which the coupling position is not in a benzene or naphthalene nucleus can be used, such as coupling components of the enol and hetocyclic types which are free from sulfonic acid and carboxy groups.

Where the coupling component has an aryl nucleus and is substituted by —(Z)$_{n-1}$—NR$_1$R$_2$ any diazotizable aryl amine of the benzene or naphthalene series which is devoid of sulfonic acid and carboxy groups can be used. As illustrative of such amino bases are compounds of the types X—Aryl—NH$_2$ in which Aryl is a benzene or naphthalene nucleus and X is hydrogen, alkyl, alkoxy, halogen, acylamino, trifluoromethyl, nitro, hydroxy, the group —COOA in which A is alkyl or hydroxyalkyl, the group —CH$_2$NA$_2$ where A is alkyl or hydroxyalkyl, the group —SO$_2$A where A is alkyl, aryl, aralkyl or benzyl, and the group —CO alkyl. In the group $$—(Z)_{n-1}—NR_1R_2$$

Z is one of a group consisting of

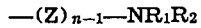

—CH$_2$— and —SO$_2$—, R$_1$ is a polyhydroxyalkyl radical having 4 to 6 carbons and one less hydroxy than carbons and R$_2$ is hydrogen, alkyl or substituted alkyl. Examples of alkyl and alkoxy radicals are methyl, ethyl, propyl, longer chain alkyl groups and the corresponding alkoxy groups. Other substituents are chloro, bromo, acetylamino, longer chain alkacylamino, —COOCH$_3$, —(CHOH)CH$_2$OH, CH$_3$CO—, —CH$_2$—N(C$_2$H$_5$)$_2$ and —SO$_2$C$_6$H$_5$. As illustrative of amino bases the following are mentioned aniline, p-chlor aniline, p-amino-acetanilide, alpha-naphthylamine, N-(p-amino-benzyl) diethanolamine, glycerol mono (p-amino benzoate), 2,5-dichlor aniline, p-nitro aniline, 5-nitro-2-amino anisol, m-(trifluoro methyl) aniline, (p-amino phenyl) methyl sulfone, p-amino acetophenone, o-nitro aniline, m-nitro aniline, o-chlor-p-nitro aniline, picramic acid, 2,6-dichlor-4-nitro aniline, m-nitro-p-toluidine, 4-nitro-1-naphthylamine, 2,4-dinitro aniline, 6-brom-2,4-dinitro aniline, meta-fluoro aniline, 4-6-dichlor-2-nitro aniline, 2,5-dinitro analine, 4-nitro-1-naphthylamine, N-(para-amino benzyl)-N-methyl glucamine, N-(para-amino benzyl)-N-methyl glucamine p-amino-sorbityl aniline, m-amino-sorbityl aniline, p-amino-methyl-sorbityl aniline, N-(para-amino benzoyl) glucamine, N-(m-amino-benzene sulfonyl) glucamine, compounds corresponding to the above glucamine compounds in which the radical of a 4 to 6 carbon aldose is present in the above glucamine compounds instead of the radical of glucose, compounds corresponding to the named sorbityl compounds in which the radical of pentaerythrytol is present instead of the radical of sorbitol, and still others.

Amino bases which are or are not substituted by the group —(Z)$_{n-1}$—NR$_1$R$_2$ can be additionally substituted by one or more alkyl, alkoxy or halogen groups.

As illustrations of coupling components the following are mentioned, sorbityl aniline, sorbityl cresidine, sorbityl-o-anisidine, N-pentaerythrityl aniline, N-mannityl aniline, sorbityl-m-toluidine, sorbityl-m-anisidine, sorbityl-p-xylidine, sorbityl-o-toluidine, sorbityl 2,5-dimethoxy aniline, fructyl cresidine, N-sorbityl alpha naphthylamine, N-sorbityl 1,5-amino naphthol, N-methyl, N-sorbityl aniline, N-methyl, N-sorbityl toluidine, N-methyl, N-sorbityl, ortho-anisidine, N-methyl, N-sorbityl cresidine, N-methyl, N-sorbityl 2,5-dimethyl aniline, N-methyl, N-sorbityl 2,5-dimethoxy aniline, N-sorbityl, N-benzyl m-toluidine, N-methyl, N-sorbityl apha-naphthylamine, N-sorbityl alpha-naphthylamine, N-hydroxyethyl, N-sorbityl m-toluidine, N-sorbityl aniline condensed with three mols of ethylene oxide, N-sorbityl, N-carbethoxy methyl aniline, N-sorbityl, N-carboxy methyl aniline, phenol, resorcin, m-amino-phenol, p-cresol, beta-naphthol, amino-naphthols, dihydroxy quinoline, phenyl-methyl-pyrazolone, acetoacetanilide, amino benzenes and amino naphthalenes.

Where the coupling component contains an aryl nucleus substituted by the group $$—(Z)_{n-1}—NR_1R_2$$

the aryl nucleus of the coupling component is not necessarily substituted by an amino or a hydroxy group.

In cases where it is difficult to make an amino base with a given substituent it is generally possible to make an intermediate containing the desired substituents which can be used as the coupling component. In this way a great variety of compounds can be made.

The symbol R$_1$ in the group —(Z)$_{n-1}$—NR$_1$R$_2$ stands for a polyhydroxyalkyl group having four to six carbon atoms and one less hydroxy group than carbons. As examples of polyhydroxyalkyl groups are mentioned the radical of the alcohol sorbitol and the radicals of reduced aldose monosaccharides, such as erythrose, glucose, arabinose and still others besides those specifically mentioned which have the required number of carbon and hydroxy radicals. The polyhydroxyalkyl amino group may be a secondary or a tertiary amino group. When tertiary, R$_2$ may be an alkyl or a substituted alkyl radical. As illustrative of such radicals methyl, ethyl, propyl, butyl and even longer chain alkyl groups, hydroxyethyl, mono- and di-hydroxy propyl, beta-hydroxy-gamma-halo-propyl and longer chain mono- and di-hydroxyalkyl groups are mentioned.

The integer $n$ is always 1 or 2. When $n$ is 1 the secondary or tertiary amino nitrogen is directly attached to the benzene ring.

As illustrative of methods by which amino bases containing the secondary or tertiary amino group may be made, one mole of glucamine is treated with one mole of meta or para-benzoyl chloride forming the corresponding N-(nitro benzoyl) glucamine. The nitro group is then reduced to amino by well known methods giving the corresponding substituted aniline. By using an alkyl glucamine instead of glucamine, N-(para-amino-benzoyl) alkyl glucamines may be made. An N-(para-amino benzyl)-N-methyl glucamine may be made by condensing methyl glucamine with para-nitro-benzyl bromide and then reducing the nitro group of the resulting compound. In like manner a meta- or paranitro-benzene sulfonyl chloride is reacted with glucamine and the nitro group of the resulting compound is then reduced to form an N-(meta or para-benzene sulfonyl) glucamine. Para-aminosorbityl aniline may be made by condensing para-amino acetanilide with glucose and catalytically reducing as with hydrogen in the presence of a hydrogenating catalyst, such as nickel. The acetyl group is then removed by hydrolysis. By similar methods the amino bases may be derived from a variety of compounds.

Coupling components containing the polyhydroxyalkyl radical in the amino group may be made by various methods. For example, a secondary arylamine may be formed by catalytically hydrogenating a solution containing a polyhydroxy alkyl aldehyde having the desired polyhydroxy radical and a substituted or unsubstituted primary aryl amine having an open position such that coupling can be made eventually to a diazotized aryl amine, the hydrogenation being carried out in the presence of a metallic hydrogenation catalyst, such as nickel or cobalt and at elevated temperatures and pressures, such as at 100° C. and 800 pounds pressure. The secondary amine can also be prepared by reacting a suitable halohydrin and the primary aryl amine by methods well known to the art, such as reacting a primary aryl amine and mannitol chlorhydrin, or a primary aryl amine and the chlorhydrin of pentaerythritol.

In general, it is convenient to form the tertiary polyhydroxyalkyl amino group from the secondary amino group by alkylating with an appropriate alkyl or substituted alkyl compound.

In general, dyeings are made by dissolving the dyes in water and entering the material to be dyed into the heated solution. A temperature of about 85° C. is generally preferred. For satisfactory results the temperatures may be about the same as those used for dyeing with insoluble dyes, namely about 70° C. to about 95° C. but higher and lower temperatures can be used. At optimum temperatures the rate of absorption of the dyes used in accordance with this invention is more rapid than with dispersed insoluble dyes, and a stronger dyeing is obtained at relatively low temperatures than with dyes which require fine dispersion. The presence of dye in excess of that which goes into solution can be used with success when the undissolved dye is dispersed in the solution as by the action of a dispersing agent, such as soap. In making prints similar solutions of the dyes or dispersions of the dyes in the solution thereof are mixed with the printing vehicle, the fabric is then printed and finally steamed, and washed.

The processes of the invention give level dyeings which are deep in shade and which do not have a specky appearance. The high solubility and good exhaust properties of the dyes permit the use solely of solutions of the dyes both in piece goods dyeing and in printing. Although the dyeings are made from solutions of the dyes, they have the unusual property of excellent fastness to washing. The presence of salt or a dispersing agent is not essential in accordance with the present invention but the process can be modified by using salt or a dispersing agent in the composition. Consequently the dye bath may be made with or without a dispersing agent. When a dispersing agent is present any undissolved soluble cellulose acetate dye or an insoluble cellulose acetate dye may be present. The process may also be modified by having salt in the dye bath together with a cellulose acetate dye which requires the presence of salt for good exhaustion.

Since from the foregoing description of the invention it will be apparent to those skilled in the art that various other embodiments of the invention may be made without departing from the spirit and scope thereof, it is to be understood that the invention is not limited to the specific embodiments disclosed.

I claim:

1. A monazo compound represented by the formula

in which $Aryl_1$ and $Aryl_2$ are each one of a group consisting of radicals of the benzene and naphthalene series which are devoid of sulfonic acid and carboxy groups, at least one of said aryl nuclei being substituted by a group $$-(Z)_{n-1}-NR_1R_2$$

wherein Z is a radical of the group consisting of

$-CH_2-$ and $-SO_2-$, $n$ is an integer not greater than 2, $R_1$ is a polyhydroxyalkyl radical having four to six carbons and one less hydroxy group than carbons, and $R_2$ is one of a group consisting of hydrogen, alkyl, hydroxyalkyl, dihydroxyalkyl and chlorhydroxyalkyl; and when $Aryl_1$ is substituted by a group $-(Z)_{n-1}-NR_1R_2$ then $Aryl_2$ is substituted by one of a group consisting of hydroxy and said group $-(Z)_{n-1}-NR_1R_2$.

2. A monazo compound represented by the formula

in which $Aryl_1$ and $Aryl_2$ are each one of a group consisting of radicals of the benzene and naphthalene series which are devoid of sulfonic acid and carboxy groups and one of the aryl nuclei is substituted by a group $-(Z)_{n-1}-NR_1R_2$ in which Z is one of a group consisting of

$-CH_2-$ and $-SO_2-$, $n$ is an integer not greater than 2, $R_1$ is a polyhydroxyalkyl radical having four to six carbons and one less hydroxy than carbons, $R_2$ is one of a group consisting of hydrogen, alkyl and hydroxyalkyl, dihydroxyalkyl and chlorhydroxyalkyl.

3. A monazo compound represented by the formula

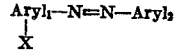

in which $Aryl_1$ and $Aryl_2$ are each one of a group consisting of radicals of the benzene and naphthalene series which are devoid of sulfonic acid and carboxy groups, X is one of a group consisting of hydrogen, alkyl, alkoxy and halogen, at least one of said nuclei being substituted by a group $-(Z)_{n-1}-NR_1R_2$ wherein Z is a radical of the group consisting of

$-CH_2-$ and $-SO_2-$, $n$ is an integer not greater than 2, $R_1$ is a polyhydroxyalkyl radical having four to six carbons and one less hydroxy group than carbons, and $R_2$ is one of a group consisting of hydrogen, alkyl hydroxyalkyl, dihydroxyalkyl and chlorhydroxyalkyl; and when Aryl₁ is substituted by a group —$(Z)_{n-1}$—$NR_1R_2$ then Aryl₂ is substituted by one of a group consisting of hydroxy and said group $$-(Z)_{n-1}-NR_1R_2$$

4. A monazo compound represented by the formula $$Aryl_1-N=N-E$$

in which E is the radical of a coupling component; Aryl₁ is the radical of one of a group consisting of benzene and naphthalene compounds which are devoid of sulfonic acid and carboxy groups and are substituted by at least one group consisting of the radial —$(Z)_{n-1}$—$NR_1R_2$ wherein Z is one of a group consisting of $$\overset{O}{\underset{\|}{-C-}}$$

—$CH_2$— and —$SO_2$—, $n$ is an integer not greater than 2, $R_1$ is a polyhydroxyalkyl radical having four to six carbons and one less hydroxy than carbons and $R_2$ is one of a group consisting of hydrogen, alkyl, hydroxyalkyl, dihydroxyalkyl and chlorhydroxyalkyl.

5. A monazo compound represented by the formula $$Aryl_1-\underset{Y}{N=N}-Aryl_2-N\begin{smallmatrix}R_1\\R_2\end{smallmatrix}$$

in which Aryl₁ and Aryl₂ are each one of a group consisting of radicals of the benzene and naphthalene series which are devoid of sulfonic acid and carboxy groups; Y is one of a group consisting of hydrogen and the group —$(Z)_{n-1}$—$NR_1R_2$ wherein Z is one of a group consisting of $$\overset{O}{\underset{\|}{-C-}}$$

—$CH_2$—, and —$SO_2$— and $n$ is an integer not greater than 2; $R_1$ is a polyhydroxyalkyl radical having four to six carbons and one less hydroxy than carbons; and $R_2$ is one of a group consisting of hydrogen, alkyl, hydroxyalkyl, dihydroxyalkyl and chlorhydroxyalkyl.

6. The compound represented by the formula $$Aryl_1-N=N-Aryl_2$$

in which Aryl₁ and Aryl₂ are each one of a group consisting of radicals of the benzene and naphthalene series which are devoid of sulfonic acid and carboxy groups; at least one of said aryl nuclei being substituted by a group $$-(Z)_{n-1}-N\begin{smallmatrix}CH_2(CHOH)_4-CH_2-OH\\R_2\end{smallmatrix}$$

wherein Z is one of a group consisting of $$\overset{O}{\underset{\|}{-C-}}$$

—$CH_2$ and —$SO_2$—; $n$ is an integer not greater than 2; $R_2$ is one of a group consisting of hydrogen, alkyl, hydroxyalkyl, dihydroxyalkyl and chlorhydroxyalkyl; and when Aryl₁ is substituted by said group $$-(Z)_{n-1}-N\begin{smallmatrix}CH_2(CHOH)_4-CH_2OH\\R_2\end{smallmatrix}$$

then Aryl₂ is substituted by one of a group consisting of hydroxy and said group $$-(Z)_{n-1}-N\begin{smallmatrix}CH_2(CHOH)_4-CH_2-OH\\R_2\end{smallmatrix}$$

7. The compound represented by the formula $$Aryl_1-\underset{X}{N=N}-Aryl_2$$

in which Aryl₁ and Aryl₂ are each one of a group consisting of radicals of the benzene and naphthalene series which are devoid of sulfonic acid and carboxy groups; X is one of a group consisting of hydrogen, alkyl, alkoxy and halogen, at least one of said aryl nuclei being substituted by a group $$-(Z)_{n-1}-N\begin{smallmatrix}CH_2(CHOH)_4-CH_2-OH\\R_2\end{smallmatrix}$$

wherein Z is one of a group consisting of $$\overset{O}{\underset{\|}{-C-}}$$

—$CH_2$— and —$SO_2$—; $n$ is an integer not greater than 2; $R_2$ is one of a group consisting of hydrogen, alkyl, hydroxyalkyl, dihydroxyalkyl and chlorhydroxyalkyl; and when Aryl₁ is substituted by said group $$-(Z)_{n-1}-N\begin{smallmatrix}CH_2(CHOH)_4-CH_2-OH\\R_2\end{smallmatrix}$$

then Aryl₂ is substituted by one of a group consisting of hydroxy and said group $$-(Z)_{n-1}-N\begin{smallmatrix}CH_2(CHOH)_4-CH_2-OH\\R_2\end{smallmatrix}$$

8. A monazo compound represented by the formula $$Aryl_1-\underset{Y}{N=N}-Aryl_2-N\begin{smallmatrix}CH_2(CHOH)_4-CH_2-OH\\R_2\end{smallmatrix}$$

in which Aryl₁ and Aryl₂ are each one of a group consisting of radicals of the benzene and naphthalene series which are devoid of sulfonic acid and carboxy groups; Y is one of a group consisting of hydrogen and the group $$-(Z)_{n-1}-N\begin{smallmatrix}CH_2-(CHOH)_4-CH_2-OH\\R_2\end{smallmatrix}$$

wherein Z is one of a group consisting of $$\overset{O}{\underset{\|}{-C-}}$$

—$CH_2$— and —$SO_2$— and $n$ is an integer not greater than 2; and $R_2$ is one of a group consisting of hydrogen, alkyl, hydroxyalkyl, dihydroxyalkyl and chlorhydroxyalkyl.

9. The process which comprises dissolving in an aqueous liquid a dyestuff represented by the formula $$Aryl_1-N=N-Aryl_2$$

in which Aryl₁ and Aryl₂ are each one of a group consisting of benzene and naphthalene nuclei which are devoid of sulfonic acid and carboxy groups, at least one of said aryl nuclei being substituted by a group —(Z)$_{n-1}$—NR$_1$R$_2$ wherein Z is a radical of the group consisting of $$-\overset{\overset{O}{\|}}{C}-$$

—CH$_2$— and —SO$_2$—, $n$ is an integer not greater than 2, R$_1$ is a polyhydroxyalkyl radical having four to six carbons and one less hydroxy group than carbons, and R$_2$ is one of a group consisting of hydrogen, alkyl, hydroxyalkyl, dihydroxyalkyl and chlorhydroxyalkyl; and when Aryl$_1$ is substituted by a group of —(Z)$_{n-1}$—NR$_1$R$_2$ then Aryl$_2$ is substituted by one of a group consisting of hydroxy and said group —(Z)$_{n-1}$NR$_1$R$_2$; heating the solution to a temperature of approximately 70° C. to 95° C.; applying said solution to textile fibres of a group consisting of fibres of cellulose esters and ethers, until said fibres are dyed; and then washing the fibres.

10. The process which comprises applying to textile fibres of the group consisting of cellulose esters and ethers, an aqueous solution comprising a dyestuff represented by the formula Aryl$_1$—N=N—Aryl$_2$ in which Aryl$_1$ and Aryl$_2$ are each one of a group consisting of benzene and naphthalene nuclei which are devoid of sulfonic acid and carboxy groups, at least one of said aryl nuclei being substituted by a group —(Z)$_{n-1}$NR$_1$R$_2$ wherein Z is a radical of the group consisting of $$-\overset{\overset{O}{\|}}{C}-$$

—CH$_2$— and —SO$_2$—, $n$ is an integer not greater than 2, R$_1$ is a polyhydroxyalkyl radical having four to six carbons and one less hydroxy group than carbons, and R$_2$ is one of a group consisting of hydrogen, alkyl, hydroxyalkyl, dihydroxyalkyl and chlorhydroxyalkyl; and when Aryl$_1$ is substituted by a group —(Z)$_{n-1}$—NR$_1$R$_2$ then Aryl$_2$ is substituted by one of a group consisting of hydroxy and said group —(Z)$_{n-1}$NR$_1$R$_2$; said application being carried out at a temperature of approximately 70° C. to 95° C. and until the fibres are dyed; and then washing the fibres.

EMMET F. HITCH.

DISCLAIMER 2,173,054.—*Emmet F. Hitch*, Wilmington, Del. MONAZO DYES FOR CELLULOSE ESTERS AND ETHERS. Patent dated September 12, 1939. Disclaimer filed June 3, 1942, by the assignee, *E. I. du Pont de Nemours & Company*.

Hereby enters this disclaimer as to claims 2 and 5 of said patent.

[*Official Gazette June 30, 1942.*]